April 18, 1950        M. E. DUNKLEY        2,504,507
PROCESS FOR PRESERVING ANIMAL FATS
Filed June 27, 1945        2 Sheets-Sheet 2
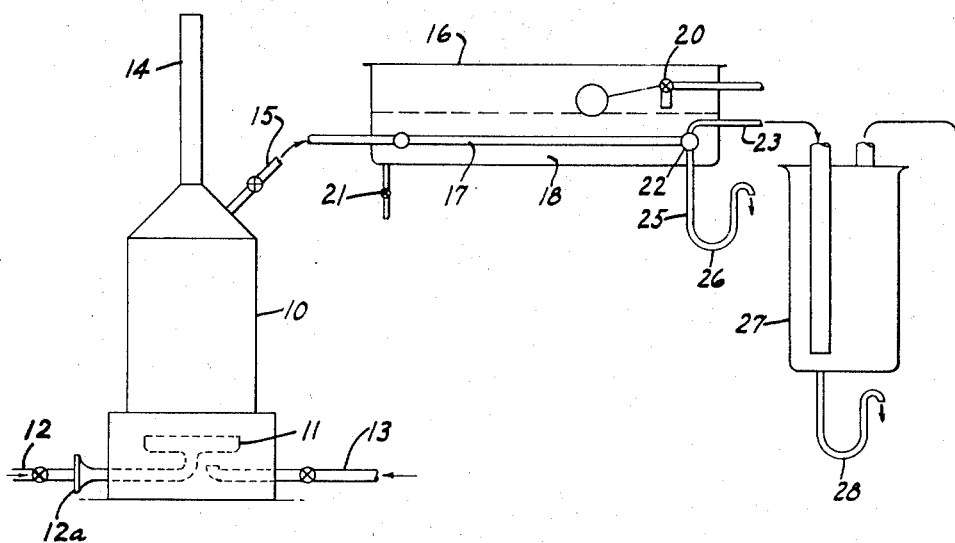
FIG.2
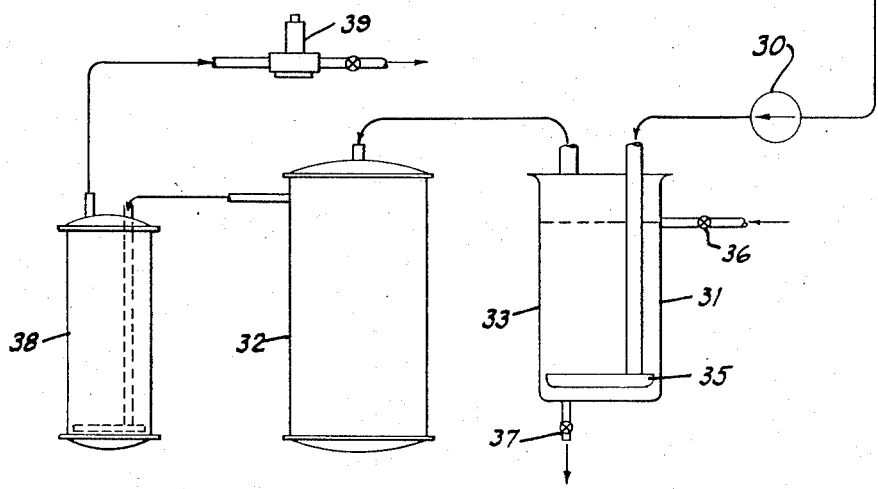
INVENTOR
MELVILLE E. DUNKLEY
BY
*Paul D. Flehr*
ATTORNEY Patented Apr. 18, 1950

2,504,507

UNITED STATES PATENT OFFICE 2,504,507

PROCESS FOR PRESERVING ANIMAL FATS

Melville E. Dunkley, Modesto, Calif.

Application June 27, 1945, Serial No. 601,767

5 Claims. (Cl. 99—163)

This invention relates generally to processes for the production of preserved animal fats or oils, and to products resulting from such processes. More particularly the invention relates to the treatment of fatty animal tissue and the fats or oils rendered from the same.

It is an object of the invention to provide a process of the above character making possible a high quality animal fat or oil having superior keeping properties.

A further object of the invention is to provide a process of the above character capable of producing relatively high yields of fats or oils from fatty animal tissue, and without the use of relatively high temperatures for rendering the fat.

Another object of the invention is to provide a new article of manufacture resulting from the present process, namely a preserved animal fat capable of being stored for long periods of time without refrigeration and without tending to become rancid or exhibiting other evidence of spoilage.

Another object of the invention is to provide novel equipment for carrying out the present process.

Referring to the drawing:

Figure 2 is a side elevational view diagrammatically illustrating equipment suitable for manufacturing my special gas.

Figure 1:
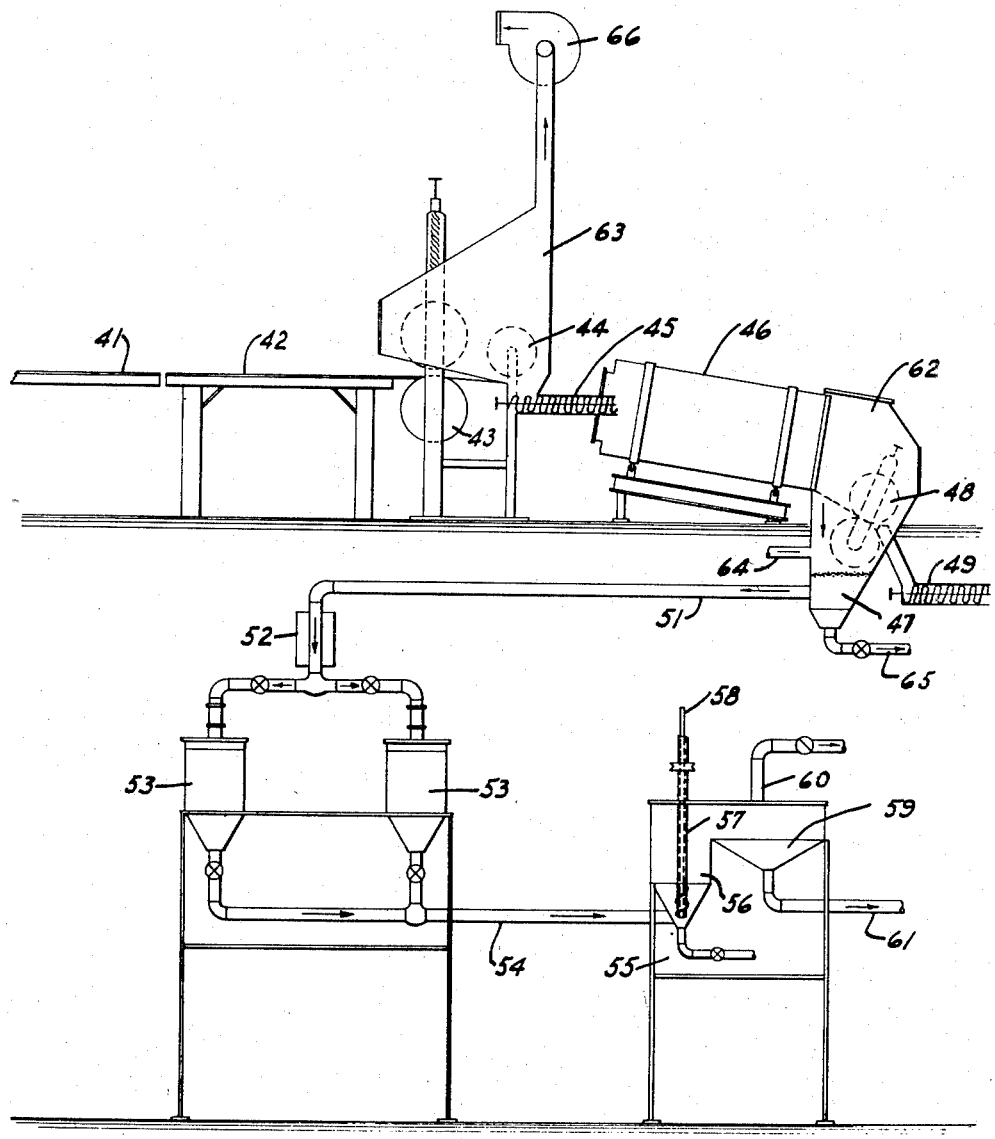
Figure 1 is a side elevational view diagrammatically illustrating equipment suitable for carrying out the present process.

In the production of animal fats or oils, such as lards, it has been common to cut the animal tissue into pieces of suitable size after which they are subjected to a relatively high temperature for rendering the fat from the same. Temperatures commonly used for this purpose range from about 250 to 350° F., with the result that the rendered fat is somewhat discolored. After the fat has been rendered it is treated in special filters using materials such as activated charcoal, for the purpose of removing solid particles and also to decolorize or improve the color of the final product. Lard rendered by such conventional methods will commence to turn rancid within a comparatively short period of time, particularly when stored in unsealed containers at room temperatures. Rancidity can be delayed by storage at refrigeration temperatures, but this is costly and is not always available.

Rancidity of lard is due to the accumulation of certain by-products resulting from progressive oxidation of the fat. According to my observations such oxidation takes place in the presence of certain complex catalysts which in general can be termed bio-catalysts. In all probability the majority of such catalysts are complex compounds of the heavy metals, principally iron and copper.

I have discovered that the bio-catalysts present in lards or like animal fats, and which are responsible for oxidation resulting in rancidity, can be inhibited by contact of the fats with a gas having the power of altering or rendering the bio-catalysts inactive. For this purpose I make use of a gaseous atmosphere which is hereinafter termed a special gas, and which can be produced as will be subsequently described in detail. This gas also appears to function as a powerful antioxidant.

In general it is desirable to practice the present process by initially cutting the animal tissue into pieces of proper size for further treatment. Either before or following this cutting operation it is desirable to pass the tissue through crushing rolls for the purpose of breaking down the cell tissue. The material is then delivered to equipment where it is heated to a temperature which will suffice to melt the fat. This will vary with different animals but in typical instances will involve temperatures ranging from 105 to 130° F. At such temperatures the fat or oil is rendered from the tissue without causing discoloration such as is experienced with higher temperatures used in the past. Throughout the heat treatment the material is enveloped in an atmosphere of my special gas. After being subjected to the heat treatment for a period of time sufficient for penetration of the heat and melting of the fat, the remaining tissue is passed through rolls or like suitable means for squeezing out remaining fat. The free oil produced during the heating operation and from squeezing the tissue is then treated by suitable filtration methods for the purpose of removing solid material. Following filtration, the fat while in liquid form is intimately contacted with my special gas, as by bubbling the gas through a quantity of the fat undergoing treatment together with agitation. This treatment serves to complete action upon the bio-catalysts present whereby these bio-catalysts are altered or otherwise conditioned in such a manner that they are no longer effective to promote oxidation. The fat can now be delivered to suitable filling machines where it is introduced into conventional containers.

Suitable special gas can be inexpensively produced by controlled burning of a fuel such as natural gas, with the amount of combustion supporting oxygen or air employed being deficient compared to the amount required for substantially complete combustion. Suitable equipment for the preparation of such a gas is shown in Figure 2. Briefly it consists of a furnace chamber 10 which has its lower portion provided with a suitable gas burner 11. Gas supply pipe 12 connects to the burner 11 and is provided with a conventional adjustable valve 12a for admitting a controlled amount of air to be intermixed with the gas. Also a supplemental valve control pipe 13 is provided which connects to the atmosphere and which serves to admit controlled amounts of secondary combustion supporting air into a region below the burner. The upper end of furnace chamber 10 is shown connected to the draft stack or flue 14, and in addition a pipe 15 is provided for withdrawing a required amount of the gaseous products of combustion. The amount of combustion supporting air is controlled so that the gaseous products of combustion formed in chamber 10 contain only traces of remaining oxygen, preferably less than 0.50%, and so that the carbon monoxide content of the products of combustion is of the order of from 0.5 to as high as 40%, depending upon the control employed and the type of fuel being utilized. A suitable range of carbon monoxide with natural fuel gas is from 1.5 to 6%.

Pipe 15 connects with a suitable controlling apparatus 16, which can consist of pipes 17 receiving gas from pipe 15, and which are immersed within a body of cooling water maintained in the tank 18. Cooling water is shown being supplied to this tank through the float controlled valve 20, and is shown being withdrawn through pipe 21. A header pipe 22 connects with the cooling pipes 17 and in turn delivers the gas to pipe 23 leading from the cooling equipment. In addition header pipe 22 is shown connected to depending pipe 25, which terminates in a U trap 26. Pipe 25 together with trap 26 serves the purpose of removing water condensing in the pipes 17, the water vapor being a by-product of the combustion in furnace chamber 10.

Pipe 23 is shown delivering the gas to a suitable separator 27, the lower end of which is also connected to a drainage trap 28. This separator serves to remove remaining droplets of water which may be entrained with the gas. The gas is pumped from separator 27 by a compressor 30 which delivers the gas to the washer 31 and storage tank 32. Washer 31 can consist of a simple closed tank 33 provided with a perforated header 35 connected to the discharge side of compressor 30. Inlet and outlet pipes 36 and 37 are shown for the purpose of maintaining a body of washing liquid in tank 33, as for example cooled deaerated water. Within tank 32 the gas is stored at a suitable pressure such as 15 to 160 lbs. per square inch. As the gas is required it is withdrawn through the filter 38 and the pressure reducing regulator 39, which supplies the gas at a substantially constant pressure. Filter 38 can make use of a suitable filtering medium such as activated charcoal, and serves to remove possible objectionable odors present in the gas.

The natural fuel gas which I have employed analyzes substantially as follows:

| | Per cent |
|---|---|
| Methane $CH_4$ | 87 |
| Ethane $C_2H_6$ | 8 |
| Propane $C_3H_3$ | 4 |
| Butane $C_4H_{10}$ | 1 |

In a typical instance proper controlled combustion as described above produces a satisfactory gas analyzing as follows:

| | Per cent |
|---|---|
| Carbon dioxide $CO_2$ | 8.2 |
| Acetylene $C_2H_2$ | 0.1 to 0.2 |
| Oxygen $O_2$ | 0.2 to 0.1 |
| Carbon monoxide CO | 3.8 |
| Methane $CH_4$ | 2.2 |
| Nitrogen $N_2$ | 85.5 |

While the effectiveness and the peculiar properties of the above gas may be due to small amounts of gases not shown by the above analysis, according to my observations the effectiveness is due primarily to the presence of carbon monoxide and acetylene. These gases exhibit a remarkable effect in poisoning or immunizing bio-catalysts of the type previously described, thus effectively altering and/or otherwise inhibiting such bio-catalysts as serve to cause or induce oxidation of animal fats with resulting rancidity. In addition, either by absorption or formation of complex compounds, there is a sustained influence tending to prevent oxidation upon exposure to the atmosphere.

A peculiar fact with respect to the inhibiting properties of the above gas is that although the initial action of the gas in inhibiting bio-catalysts is comparatively rapid and is capable of penetrating through the fat being treated, there does not appear to be appreciable reconversion of the bio-catalysts back to their active noninhibited state, even when the lard is stored in tin cans which are not hermetically sealed, and at ordinary room temperatures. This is attributed in part to sustained inhibition of bio-catalysts and in part to the antioxidation effect previously mentioned.

The process described above is relatively simple and can be carried out commercially without appreciably adding to the cost of the lard over the cost of carrying out conventional methods. The final product is of high quality compared to conventional lard. Particularly it has better palatability and a whiter color. In addition it can be stored at room temperatures for long periods of time in ordinary metal containers which are not hermetically sealed, without noticeable tendency toward rancidity. In the marketing of my product it is not necessary to resort to refrigeration in order to avoid rancidity. Therefore storage and handling before the material reaches the ultimate consumer is greatly simplified and made less expensive.

Suitable apparatus for carrying out the process described above is shown in Figure 1. Briefly this apparatus consists of conveying means 41 by means of which the leaf lard or like animal tissue is supplied to the remainder of the equipment. Conveyor 41 delivers to the feed table 42 where the material is inspected and from which the material passes to the crushing rolls 43. After passing through the crushing rolls the crushed material passes through the knives 44 which cut the material into strips of suitable width. A screw conveyor 45 delivers the sliced material to the rotary drum 46 which is heated by suitable means such as steam jacketing. It is within this drum that the material is heated to a suitable temperature such as of the order of 150° F. for rendering the fat from the tissue. Fat rendered during this heat treatment drains into the collecting hopper 47 while tissue which is finally discharged from the lower end of the drum 46, is delivered to the squeezing rolls 48.

In passing through these rolls further fat is expressed from the tissue and this fat is likewise collected in hopper 47. The tissue after passing through the rolls is removed by means of the screw conveyor 49.

The liquid fat in hopper 47 is removed through pipe 51, and a part of this pipe is provided with a steam jacket 52 in order to keep the fat in liquid form. The fat is then delivered to one or the other of the dual filters 53, and the filtered material is delivered through pipe 54 to the further treatment apparatus 55. Filters 53 can use any suitable filtering medium such as activated charcoal which serves to remove solid particles or other foreign material.

Apparatus 55 includes the treatment chamber 56 into the lower end of which the fat is delivered from pipe 54. Container 56 is equipped with a relatively high speed agitator 57, the shaft of which is hollow to receive gas from line 58 as indicated. The treated fat from container 56 passes to the separator hopper 59, which connects with the discharge pipe 61. An additional pipe 60 connects with the top of hopper 59 and serves to vent off gas. Pipe 61 leads to suitable filling machines which serve to introduce the processed lard into suitable containers for marketing.

It is desirable to enclose certain parts of the equipment in order to insure that the material undergoing treatment is not exposed to the exterior atmosphere, but on the contrary is subjected to my special treatment gas. Thus the connection between the discharge end of drum 46 and the hopper 47 is enclosed by the housing 62, and the feed screw 45 is enclosed whereby atmosphere in drum 46 may pass continually into a housing 63, which generally encloses the upper one of the crushing rolls 43 and the slicing knives 44. The housing 63 is in turn connected to the suction side of an exhaust fan 66. My special gas is continuously bled into the hopper 47 through pipe 64. Thus this gas continually progresses through the equipment at a static pressure slightly above atmospheric to be finally discharged by the exhaust fan 66. This insures the absence of exterior atmosphere from the drum 46, and also from the housing 63. Thus treatment with my special gas occurs throughout passage of material through the apparatus, with the final treatment taking place in apparatus 55.

Operation of the apparatus shown in Figure 1 can be briefly reviewed as follows: The leaf lard derived from pork or mutton is delivered by conveyor 41 to table 42, after which it passes through the crushing rolls 43 for breaking down the cell tissue. The crushed material is then sliced by knives 44 into strips which are fed by screw conveyor 45 into the heated drum 46. In this drum the material is heated to an elevated temperature of the order of 150° F. which serves to render lard from the tissue. Rendered fat flows down into hopper 47 and the tissue is squeezed between rolls 48 to express out further fat. Fat rendered in this fashion is then passed through pipe 51 into one or the other of filters 53, after which it passes to the treatment apparatus 55. In the chamber 56 of this apparatus the fat in liquid form is intimately contacted with the special gas described above and which is supplied through the shaft of the agitator 57 from the line 58. In other words the liquid at this time is agitated and is thoroughly commingled or aerated with the treatment gas. The treated oil then passes to the separator 59 to enable exhaust of gas through pipe 60, with the fat itself being delivered through pipe 61 to the filling machine.

Throughout its passage through the equipment described above the tissue and the subsequently rendered fat is protected against contact with the atmosphere, and is at all times subject to my special gas. Thus gas is continually bled into the equipment through the pipe 64, and this gas progresses through drum 46, the shrouding about conveyor 45, and housing 63, to be finally exhausted to the atmosphere through the fan 66.

In the foregoing process reference has been made to use of heat treatment for melting fat from the tissue. However it is possible to apply my process to the treatment and preservation of fresh animal fat tissue, without heat treatment. In such event the tissue is cut into cubes or strips of uniform size and then placed in an atmosphere of my special gas for a suitable extended treatment period of say 30 to 60 minutes. The gas penetrates the fragments to effectively inhibit bio-catalysts with the result that such fat resists rancidity on storage. Treatment of this character may be employed to preserve fresh animal fat tissue for a period of storage or shipment preliminary to using the same in the above described process for removing and preserving the fat.

I claim:

1. In a process for the treatment of fatty animal tissue, removing fat from the tissue by heat treatment of the same, and then commingling the removed liquid fat with bubbles of a gas consisting of products of combustion analyzing substantially 8.2% carbon dioxide, 0.1 to 0.2% acetylene, 0.2 to 0.1% oxygen, 3.8% carbon monoxide, 2.2% methane, and 85.5% nitrogen.

2. In a process for the treatment of fatty animal tissue, removing fat from the tissue by heat treatment of the same while enveloping the tissue in a special gaseous atmosphere, collecting the removed fat, and then intimately commingling the fat with bubbles of said special gas, said special gas consisting of products of combustion analyzing substantially 8.2% carbon dioxide, 0.1 to 0.2% acetylene, 0.2 to 0.1% oxygen, 3.8% carbon monoxide, 2.2% methane, and 85.5% nitrogen.

3. In a process for producing preserved animal fat, enveloping and intimately intermixing the fat while in liquid form with bubbles of a gas analyzing substantially 3.8% carbon monoxide, 0.1 to 0.2% acetylene and 0.2 to 0.1% oxygen, 2.2% methane, 8.2% carbon dioxide and 85.5% nitrogen.

4. In a process for producing preserved animal fat, commingling the liquid fat with bubbles of a gas, analyzing substantially 8.2% carbon dioxide, 0.1 to 0.2% acetylene, 0.2 to 0.1 oxygen, 3.8% carbon monoxide, 2.2% methane, and 85.5% nitrogen.

5. In a process for producing preserved animal fat from fat tissue comprising heating the tissue to a temperature of the order of from 105 to 130° F. whereby fat is melted from the tissue, squeezing out remaining fat from the tissue, removing solid material from the removed fat and intermixing the fat with bubbles of a gas analyzing substantially 8.2% carbon dioxide, 0.1 to 0.2% acetylene, 0.2 to 0.1% oxygen, 3.8% carbon monoxide, 2.2% methane, and 85.5% nitrogen.

MELVILLE E. DUNKLEY.

(References on following page)

REFERENCES CITED

UNITED STATES PATENTS

The following references are of record in the file of this patent:

| Number | Name | Date |
|---|---|---|
| 41,010 | Johnston | Dec. 22, 1863 |
| 970,623 | Hemming | Sept. 20, 1910 |
| 1,250,079 | Bart | Dec. 11, 1917 |

FOREIGN PATENTS

| Number | Country | Date |
|---|---|---|
| 1,501 | Great Britain | Apr. 23, 1875 |
| 5,575 | Great Britain | Nov. 23, 1882 |
| 425,903 | Great Britain | Mar. 19, 1935 |

OTHER REFERENCES

MacNaughton, "Elementary Steam Power Engineering," Wiley & Sons (1923), page 142.

Mellor, Comprehensive Treatise on Inorganic & Theor. Chemistry, vol. 5, (1924), pp. 813–815.